United States Patent [19]
Cesarini

[11] Patent Number: 5,292,004
[45] Date of Patent: Mar. 8, 1994

[54] PROCESS FOR ADDRESSING TO A RECIPIENT

[76] Inventor: Roger Cesarini, 128, rue Paul Doumer, 94290 Villeneuve le Roi, France

[21] Appl. No.: 982,051

[22] Filed: Nov. 25, 1992

Related U.S. Application Data

[63] Continuation of Ser. No. 434,687, Aug. 8, 1990, abandoned.

[30] Foreign Application Priority Data

Feb. 3, 1988 [FR] France .................................. 88 01258

[51] Int. Cl.5 ................................................ B07C 5/02
[52] U.S. Cl. ...................................... 209/3.1; 209/3.3; 209/584; 209/900
[58] Field of Search ................. 209/3.1, 3.3, 546, 569, 209/583, 584, 900

[56] References Cited

U.S. PATENT DOCUMENTS

| | | | |
|---|---|---|---|
| 2,775,405 | 12/1956 | Paston | 209/900 X |
| 3,858,054 | 12/1974 | Hutner et al. | |
| 3,933,094 | 1/1976 | Murphy et al. | 209/584 X |
| 4,117,975 | 10/1978 | Gunn | 209/584 X |
| 4,122,526 | 10/1978 | Dlugos et al. | |
| 4,868,570 | 9/1989 | Davis | 209/584 X |
| 4,992,649 | 2/1991 | Mampe et al. | 209/900 X |
| 5,031,223 | 7/1991 | Rosenbaum et al. | 209/584 X |

FOREIGN PATENT DOCUMENTS

| | | | |
|---|---|---|---|
| 0272355 | 6/1988 | European Pat. Off. | |
| 2236565 | 2/1975 | France | 209/900 |
| 2414962 | 8/1979 | France | |
| 2097330 | 11/1982 | United Kingdom | 209/584 |

*Primary Examiner*—David H. Bollinger
*Attorney, Agent, or Firm*—Cushman, Darby & Cushman

[57] ABSTRACT

A process for sending to a recipient either a message, especially computer information, or items such as a document, envelope, letter, packet, parcel, load and others. It allocates to each message, or item, two references called respectively "identifier" and "locator" which together correspond to a single recipient, the identifier being formed by the combination of a code for geographical location and the recipients telephone number, whilst the locator is formed by coordinates, preferably in the form of digits coming from a grid which is established for a certain geographical zone, coordinates which correspond to a mesh of the grid representing the most accurate geographical location possible of the recipient. According to a particular mode of application, the geographic location code is formed by the official code of an administrative zone such as a Department for France, a County for the USA and the U.K., a "Landkreis" for Germany and similar.

1 Claim, 5 Drawing Sheets

1   Georg ZARZAVATDJIAN
    1421 Spring Road
    ARLINGTON VA 22215
    (U.S.A.)                                                1 222 703 845 09 84

2   Zadora LACZKOWSKA
    Ul. Stojalowskiego, 47
    35-568 SZCZECINEK
    (Pologne)                                               48 32 41 47 821

3   Herr Helmut BAUER
    Aiblinger Strasse 8/1
    8000 MÜNCHEN
    (Bundesrepublik Deutschland)                            49 80 89 16 87 59

4   Maïté UNHASSOBISCAY-GOYENETCHE
    Uhaldia Etchéa
    64220 DONIBANE-GARAZI
    (France)                                                33 64 59 37 88 47

5   Stefan BUERBEBISTAH
    396 Ulitza Techerghiol
    18345 SARMIZECETUZA
    (Roumanie)                                              40 18 5 89 131

PROCESS FOR ADDRESSING TO A RECIPIENT

This is a continuation of Application No. 07/434,687, filed on Aug. 8, 1990, which is now abandoned.

There is at present no means whatsoever of automatically sending a message to an individual addressee without the need for data preparation by someone.

This applies, for example, to the document EP-A-0 272 355 which describes an installation comprising a computer controlled by a central administration system and in whose memory all the information regarding all the possible addresses is stored.

Now, it is known that 87% of transmission errors that occur in data processing or the routing of items (letters, parcels, etc.) is due to faulty data logging operations.

In addition, this document requires the creation of standard envelopes or cards whose data must be read by the computer.

The data correspond exclusively to postal information: name, address and postal code. It should be noted that the postal code is common to a very large number of addresses and not to any single character.

This invention provides a solution to the problem of routing, and has an almost universal application. It relates to the industrial field of material or non-material (information data) transfer: the transport of physical objects from one place to another.

It enables several characteristic commercial problems to be resolved: sorting, transport, transport equipment control, vehicle loading, final collection—all without any logging operation.

It is necessary to emphasize the usefulness of the invention by pointing out that it enables the elimination of many of the difficulties encountered in the internationalisation of exchanges arising from cultural inadaptation, foreign languages, writing and spelling.

One is of course aware of the non-material method and shrinks from any inventive activity that consists of assigning a code consisting of digits to a particular addressee. This code is more or less elaborate depending on whether it contains place, date and analog symbols. This is the case of filed addressees to which firms must send articles: journals, catalogues, packets, etc. Here are two actual examples, taken at random from the thousands of different ones:

- 091136 33AD U1609400 8888 552 for forwarding a catalogue
- 39738 820000 76001077R4377220615 0569 for forwarding a periodical to a subscriber.

It will be noted that these codes mean nothing at all to a person who is not known to the sender, and it must be emphasized that if such a code has significance in clear writing it can only be understood by those who know the key to the code.

Two examples of private firms may be quoted. Here are two examples of national public departments in France:

B - 402112948000457964 for identifying a firm in the commercial Trade Register
- 1 54 05 64 023 458 for identifying a person on the National Health Service list in France.

It is obvious that these codes are not arbitrary and one may, for all useful purposes, recall here the structure of the second of these codes: the "Serial security number" allocated in France to a beneficiary:

- 1 indicates that it relates to a male person
- 54 is the date of his birth
- 05 is the number of the month in the year (May)
- 64 is the number of the registration of births department (Atlantic Pyrenees)
- 023 is a number allocated to the place of birth
- 458 is a serial number allocated in chronological order.

These examples illustrate a basic characteristic of the existing codes; they are unique to each creator organization, and any "significance" is only partial; they have no international, universal capability, notably of controlling sorting machines and installations in one or more countries with different languages and even different writing. They are inaccessible to the public, and they are often strictly confidential since they constitute the key to certain private information: subscription date, system of payment, advance list, etc. In any case, there is no "list" at all enabling their use for purposes other than those required by the sole originating organization.

This invention differs completely from these elementary codings by providing a real method of control that can be used by anyone for conducting transfer and transport processes, but which contains no private confidential element whatsoever.

The object of this invention is a process for sending to an addressee a message which includes a data processing item and including an object such as a document, an envelope, a letter, packet, package, bundle or. Each message has two references known respectively as "identifier" and "locator", which together correspond to the addressee, the identifier being formed by the combination of the addressee's geographical location and telephone number, and the locator being formed by coordinates, preferably in the form of digits obtained from a frame that can be devised for a particular geographical zone, that correspond to a mesh of the frame, representing the addressee's geographical location as possible.

Depending on the other characteristics of this process:

-the geographic location code is formed by the official code of an administrative zone such as a province for France, a "county" for the United States and the United Kingdom, a "region" for Germany, and so on;
-the code for the geographical situation is formed by the addressee's postal address code;
-the frame is formed by the land register, representing numbered parcels of land, the coordinates being either the combination of abscissae and ordinates, or the number of the parcels of land;
-the frame is a grid;
-the frame consists of at least one group of zones determined individually by references, some at least of these zones consisting of a grid provided with coordinates;
-the grid of the zones corresponding to towns has a denser mesh than that of the grid of zones that relate to the country areas.

The invention also provides for a device for utilising the above process, characterised by the fact that it comprises, possibly in separate locations, (a) a memory containing for each possible addressee the name and address of the person in clear writing, and also his "identifying" symbol and his "location" symbol; (b) a computer, and at least one data processing software package; (c) an apparatus for marking items such as documents, envelopes, letters, packets, parcels, bundles, etc., either directly or by way of tags, labels and suchlike, so that each item bears at one and the same time the details in clear writing, the identifying and location symbols, and possibly also an automatic reading code such as that known as a "bar code"; and (d) a means for the unit and group sorting of the marked items according to their despatch.

Depending on the other characteristics of this device:
-it includes devices for unit and group sorting of the marked items before distribution to the addressees;
-the devices for unit and group sorting of marked items before distribution include a carousel having at least one item entry point and at least one item exit point, this exit, respectively each exit, being provided with a mobile guide between two positions, in one of which it is situated on the path taken by the carousel for directing the item on the carousel towards the appropriate exit and designed to leave the carousel by this exit, and in the other of which it is outside the path taken by the carousel so that each item can pass in front to avoid the said exit;
-it includes a means of display, such as a screen, for the visualisation of graphic representations of geographical zones and their corresponding frame.

The invention will be better understood from the detailed description given below, with the aid of the attached drawing. The description and the drawing are of course provided only by way of example, and are not exhaustive.

According to the invention, a reference is allocated to the items to be despatched; this reference consists not of a simple code but a genuine "identifier", since it contains symbols (preferably only digits) that correspond to public, and even international, elements that identify, with certainty and precision, any addressee who is a telephone subscriber in his country.

As a result, all delivery procedures, including the physical transportation of objects, can be carried out without any manual data preparation operation. This automation system enables any kind of machine to be used, and limits intervention by humans to what is strictly necessary.

The result is that problems of language and spelling, which sometimes cannot be resolved, are eliminated since definite identification of an addressee is assured by means of digits, whatever the addressee's nationality.

Figure 1:
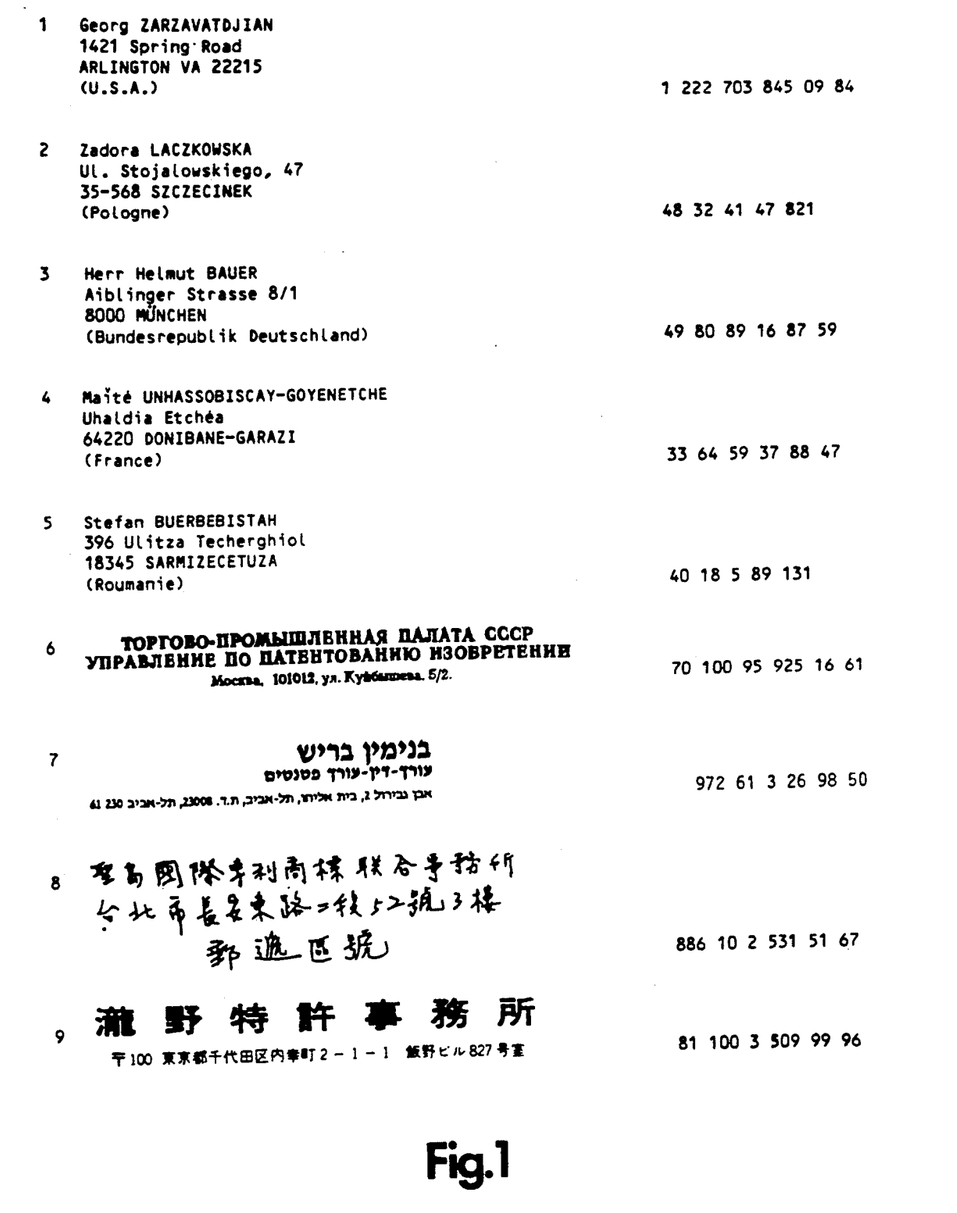
FIG. 1 is a table showing (on the left) the names and addresses in lear writing, and (on the right) the identifying symbols according to the invention.

In FIG. 1 a table is shown which contains 2 columns. In the left hand column are names and addresses in clear writing; their complexity is obvious since they have different handwriting and since, with the same handwriting, they are far from being uniform. In the right hand column, for each person, the reference or "identifier" is given in exactly corresponding digits. It is quite obvious that this identifier is almost universal and can be read directly by anyone, whatever his or her nationality and culture. It can be seen, for example, that a Japanese can easily send something to the person situated in the position 7 if he can use the corresponding identifier of the right hand column, because he would not need to "read" the name and address—it would be sufficient for him to use the digits.

The identifier contains two essential parts, of different types, which overlap so as to act together like a corrector in order to avoid any error: the first part consists of a geographical location code.

In this case, the geographical location code contains two groups. Depending on the country, the first group may contain 2 or 3 digits, and constitutes the international code which identifies the addressee's country for automatic telephone calls. In the order given in the table we find, for the first example of the addresses, the number 1 which identifies the United States; for the second, the number 48 which identifies Poland; for the third, the number 49 which identifies West Germany; for the fourth, the number 33 which identifies France; for the fifth, the number 40 which identifies Roumania; for the sixth, the number 70 which identifies the USSR; for the seventh, the number 972 which identifies Israel; for the eighth, the number 886 which identifies the Republic of China; and for the ninth and last example of this table, the number 81 which identifies Japan.

The second group of digits consists of the part of the administrative official post code known by all and freely accessible which, in France, characterises the province and in the majority of countries comparable administrative divisions: county, region, etc. In the order given in the table, we find for the first addressee, the number 222 which indicates the country containing the town of Arlington; for the second, the number 32 which indicates the district in which the town of Szczecinek is located; for the third, the number 80 constituted by the first two digits of the Munich postal code; for the fourth, the number 54 corresponding to the province of the Atlantic Pyrenees; for the fifth, the number 18 which corresponds to "the Albaiulia" (Roumanian equivalent of the French province) containing the town of Sarmizecetuza; for the sixth, the number 100 which is the postal code of Moscow; for the seventh, the number 6 which is the postal code of Tel Aviv; for the eighth, the number 10 which is the postal code of Taipeh; and for the ninth and last example of this table, the number 100 which is the postal code of Tokyo.

All the other digits are those that constitute the addressee's telephone number. It will be noted that combining a geographical location code with the telephone number enables gross errors that would arise from grouping an incompatible telephone number and a location code to be avoided because a correlation exists between these two elements.

It is seen that for different countries, the final number is variable. If one wishes to standardize this identifier, particularly in data processing, it is advisable to give it a constant structure. Here, there are two identifiers that have 14 digits: the first and the sixth. One might propose making of the other identifiers to 14 digits also, but it must be noted that first has only one digit (1) for defining the country, although certain countries are identified by a code having three digits: the seventh and eighth (972 for Israel and 886 for the Republic of China). It is therefore more rational always to provide the maximum number of digits which, for example, would give:

```
001 222 703 845 009 094 for the first
048 032 000 041 047 821 for the second
070 100 095 925 016 061 for the sixth
886 010 002 531 051 067 for the eighth, etc.
```

The identifier that one is going to describe must be complete if one wishes to ensure delivery of items: mail, articles ordered by correspondence, provisioning of shops by suppliers, etc.

The complement, called the "locator", enables the addressee's geographical location to be determined most precisely and, in combination with the "identifier", assures the machine and automatic machine control functions.

To ensure the universal nature of the process, it is advisable to use only digits; this is the reason for quoting the example below. However, in practice, one might have to adopt letters or other symbols, depending on the rules or customs of a particular country (alphanumeric system).

It is first of all necessary to establish geographical zones, subdivided more and more, in order to resolve the more general or more particular problem. By comparison with optics, one might say that one behaves like a zoom lens.

We know that the whole world is divided, according to the UTN (universal transverse Merkator projection), into squares of 100 km side, with triangular adjustment every 6° of longitude, then by sucessive refinements and according to requirements, up to squares of 100 m side, of 10 m side, of 1 m side. One can thus locate point (and hence the residence of an addressee) to within 1 m, in terms of world coordinates.

The process according to the invention therefore has no functional territorial limits but, to fix the ideas without over-complicating the description, one must start from a country and not the whole world.

Figure 2:
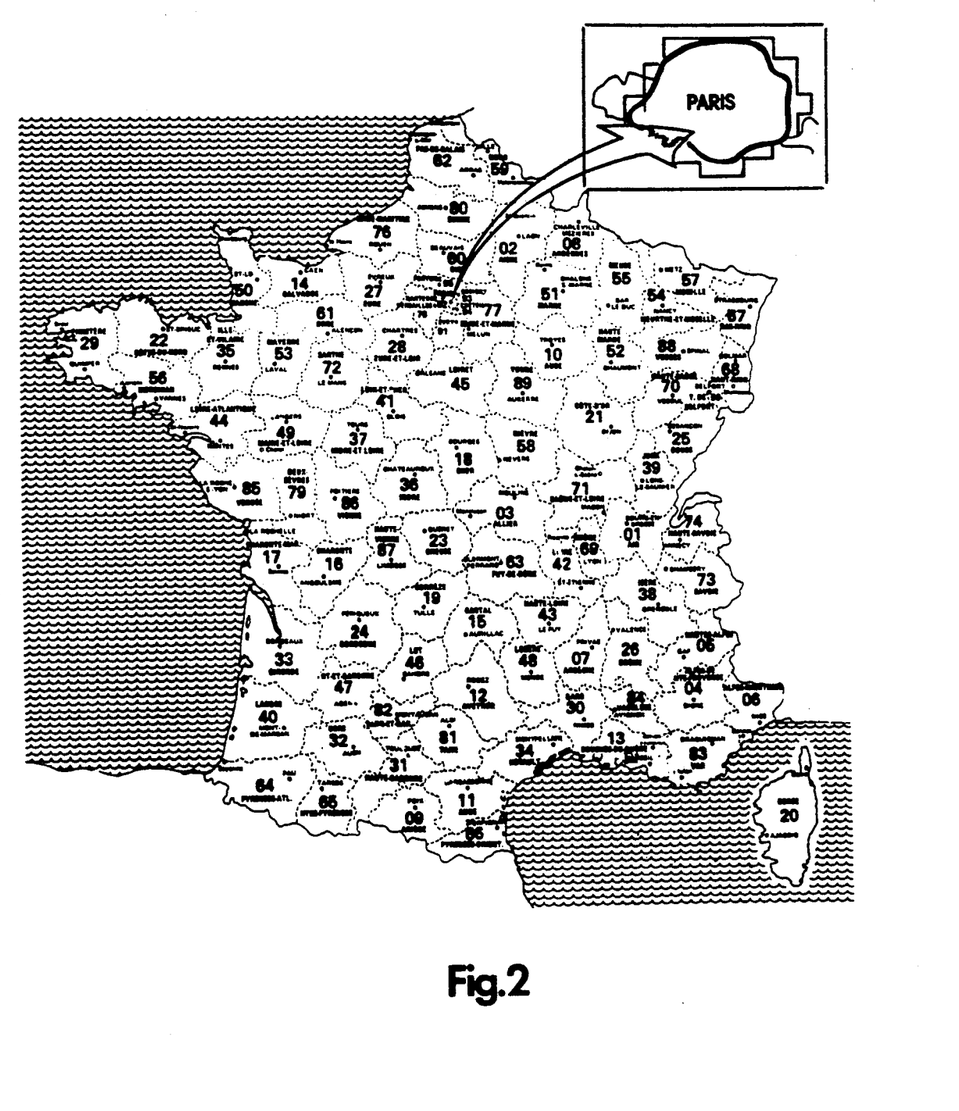
FIG. 2 is a metropolitan map of France showing its provinces, with a larger scale map of the city of Paris.

In FIG. 2, a map of metropolitan France and its provinces is shown. It includes towns or urban zones and country districts or rural zones. The population densities, and hence possible addressees, are different in an urban zone from those in a rural zone. To illustrate the invention the example of an urban zone has been chosen, which enables the possibilities of the invention to be shown better than they could in a simple rural zone. In this map, Paris is located, chosen as the urban zone.

Figure 3:
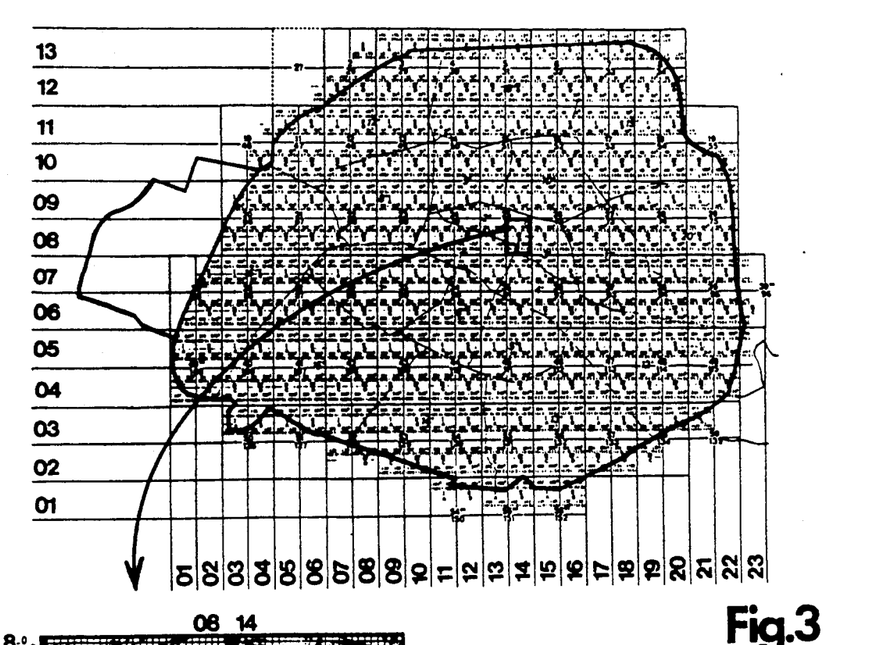
FIG. 3 is a plan of Paris including all the "plots" of the survey plan "within the walls" of Paris, with a coordinate system according to the invention, the location of the "plots" or "parcels" having 08 14 for coordinates.

In FIG. 3, the city of Paris (intra muros) is shown, i.e. excluding its suburbs and all the urban outskirts. The council has divided the city into standard parcels represented by rectangular plans or "plots" that constitute a frame, each of which has a reference. These references have not been used—although they are official, public and freely accessible—because they are unnecessarily complicated and include letters and also roman numerals, contrary to the desire for universality of the process according to the invention.

On the other hand, it is seen that this existing arrangement is particularly propitious for the adoption of a system of rectangular coordinates.

In the manner of cartesian coordinates, starting from a common origin, one numbers the horizontal lines of the parcels from bottom to top, and the vertical columns from left to right.

For the city of Paris, we thus have 30 lines and 23 columns.

To illustrate the invention, the parcel whose coordinates are 08 14 is chosen because, by convention, first consideration is given to the horizontal lines.

Figure 4:
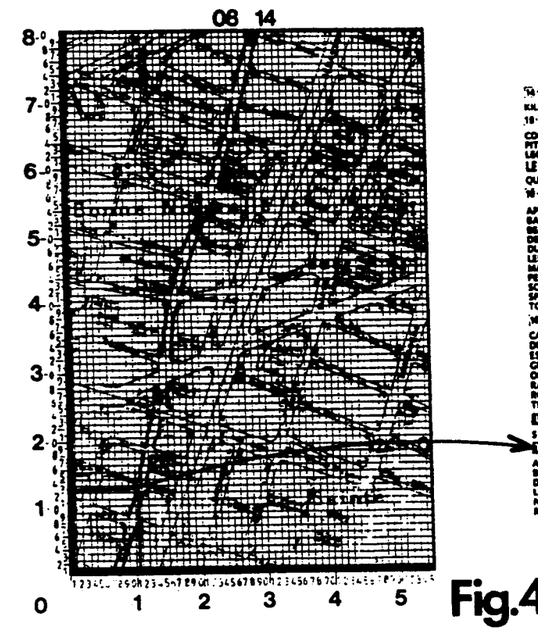
FIG. 4 represents the plot or parcel 08 14 with a grid of 10 m for abscissae and 10 m for ordinates and a coordinate system according to the invention.

This parcel is represented in FIG. 4.

Study showed that in a case of a population density such as that of Paris, it would be necessary to provide a frame that is well sub-divided, and a distance of 6 m between the horizontal lines and 6 m between the vertical lines has been adopted. A more sub-divided frame would be necessary if, in the group, the dwellings were often less than 10 m. On the other hand, one would need to have a looser frame in the case of buildings that were generally larger. The choice of the frame thus depends on local conditions, but it will be seen that the process is very flexible and can be adapted to all possible frames and, indeed, can be expressed in any system of measurement—the metric system or not.

We give the lines and columns reference points on the abscissae in the ordinates. Here, by an analogy with a Cartesian system having a single origin, we mark off numbers upwards and from left to right from the lower left corner of the fragment.

To facilitate read-off, the tens are larger than the units. We see that for each fragment there are eighty horizontal lines and fifty five vertical columns.

After constructing this network, we determine the coordinates of each flat according to its official address. As an example, we have set up at FIG. 5 an extract from the Subscribers' official telephone Directory listed by roads. We have taken as an example the case of the road Saint Denis which we have drawn with a thicker line than the others on the plan 08 14.

Figure 5:
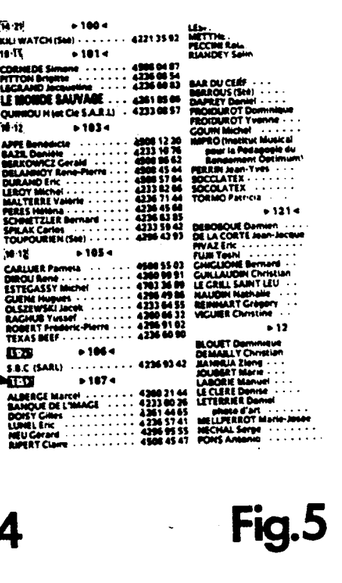
FIG. 5 is an extract from the guide to the Paris telephone subscribers, classified in terms of streets, and containing several addresses in la rue Saint Denis.

We see that the flat situated at number 107 and featuring in the fragment 08 14, has the coordinates 11 13 if we adopt the convention of placing the abscissae first and the ordinates second and inversely, 13 11 if we adopt the convention of placing the ordinates first and the abscissae second.

With the usual means, we would address thus the envelope, or the label of a parcel intended for the first inhabitant (by alphabetical order) in the flat:

```
Monsieur ALBERGE Marcel
107 rue Saint Denis
75001 PARIS
(France)
```

It was shown in FIG. 1 that an address of this type is only truly clear to the French. On the other hand if we apply the procedure in the invention, it will be seen that this person is precisely indentified and located in the following manner, by people from any part of the world:

| 33 75 42 60 21 44 08 14 11 13 |
|---|

In the whole world, there is only one person who has this identification and location. Error is impossible, even in a large block of flats for only one person has the indicated telephone number.

However, we can introduce supplementary indicators into the location for a building, a floor, a door and letter box number. A particularly interesting code is that which corresponds to the floor of the flat in which the recipient lives. After having received the 1st coordinates x and y in a plan, we can obtain the coordinate z in the third dimension. We can, for example, reserve on this coordinate or "key", two digits giving 99 selections and which the user may utilise in different ways. A sales organisation corresponding with private persons, can include in this key the floor of the recipient, it being presumed that there is no block of flats in the zone of its clientele with more than 99 floors.

A firm usually delivering parcels to a clientele of professionals can add to this key another pointer:
01=shop, 02=workshop, 3=factory 04=office, etc.

A company may also use the identifier and locator for its own establishments and can then adopt the "code" z to designate the number of an office in a whole block of flats if there are not more than 99.

When we want to ensure still greater finesse, we may retain not two digits but four, for example, in two groups-the first designating the floor and the other a door number.

We would thus, have for a recipient:

| 33 75 42 36 76 89 08 14 55 23 05 12 | |
|---|---|
| 33 | France |
| 75 | Paris |
| 42, 36, 78, 89 | Telephone Number |
| 08, 14 | Land registry plot |
| 55, 23 | Coordinates on the plan |
| 05 | 5th floor |
| 12 | Door No. 12 |

In any case, the "code z" constitutes what we call a "key of the interlocking" of the group identifier-locator and plays the role of corrector in case of error in the initial search.

It may happen that in a block of flats, having the coordinates x and y defined, two or three persons have the same name and have neighbouring telephone numbers. Their identifiers may be:

| 33 75 42 36 33 31 |
|---|
| 33 75 42 36 33 32 |
| 33 75 42 36 33 33 |

An error in the initial search is immediately shown up due to "code z". If the operator is searching: 33 75 42 36 33 31 and in error registers: 33 75 42 36 33 33 this is immediately revealed to the operator, who can correct it, as soon as he trawls the "code z" if the two recipients, have by hypothesis, the same name, live on different floors, or have different doors on the same floor:

| 33 75 42 36 33 31 08 14 40 17 04 00 |
|---|

-continued

| 33 75 42 36 33 33 08 14 40 17 05 01 |
|---| being supposed correct, one can understand that the operator will be alerted if it registers and as soon as it registers, an error in "code z":

| 33 75 42 36 33 31 08 14 40 17 05 (stop) |
|---|

A frequent situation in France is that in the older blocks of flats, there are two or three appartments per floor and they are usually designated by "right" "face" and "left" on the landings of the staircases. The operator who is confronted often with this problem, can then utilise the "code z" with four figures, using the first group to designate the floors and the second group to designate the door with the following designation: 01=left door, 02=door facing, 03=right hand door (sequence taken in a clockwise direction). If there are more than three possible doors, they can be numbered from 01 to 99 in a clockwise direction.

When dealing with routes and roads, the name and address of the recipient must be clearly written, as the delivery of items in these cases cannot be done by machines but persons such as postman, delivery man, porter etc.

However, the process can simplify the initial search as, at least in France, it is possible to obtain by a computer terminal called "MINITEL" supplied by the telecommunications administration, the postal coordinates of persons whose telephone number is known. It is then easy to proceed with an authomatic search by means of a print-out or a computer interface, the operator being in a better position than others to get the address as he just needs to use the telephone number.

For a plain language reading, it just suffices to effect a graphic print-out of the information on the screen by known methods.

Naturally, it would be particularly desirable that by the same service provided by MINITEL, any person interrogating the memory, receives not only the name and address in point but also the locator.

One could, for example, proceed thus:

knowing that the recipient is in France, in Paris and has the telephone number:

| 42 77 02 11 |
|---| we access to the list of subscribers via MINITEL by keying in the number 11. We enter the telephone number thus: 75 (code of "department") 42 77 02 11.

We bring up onto the screen and we print by known means the following information:

| SOCIETE RHIN RHONE ROUTE TRANSFRET |
|---|
| 43 rue Beau bourg |
| 75003 PARIS 08 14 44 12 |

All that remains then is to prepare a ticket or label, or retain in the memory for addressing the combined identifier and locator:

```
33 75 42 77 02 11 08 14 44 12
```

Naturally, we may omit the country code, (in this case 33 for France) if we are not having intermational dealings. Equally, we can place at the beginning the code of the "department" (here 75 for Paris) and then the country code (here 33 for France) of we do not want to separate, mainly for convenience of the initial search, the geographic digits and the telephone digits:

```
75 42 77 02 11 08 14 44 12
         or
75 33 42 77 02 11 08 14 44 12
```

For France, the number of the "departement" is the only code used as a purely geographical indicator in the identifier, but as the first number of the international telephone code has greater geographical significance; identification of the country, it would seem preferably to place this at the front.

In France, there is an administrative organisation of postal services called "CEDEX" which comprises several letter boxes at one distribution point.

We can thus use the "code z" to identify the CEDEX by the first group of two digits and the number of the letter box by the last group of two digits.

It can be pointed out that we effect a great reduction in file space by having in the memory just twenty digits instead of a complex text of at least three lines and problems of transcription is eliminated:

The Roman, the Greek, Hebrew, Arabic, Chinese, Japanese and Cyrillic etc., are replaced by digits, which are universal.

Moreover, as the identifier corresponds to one person only, it suffices to use this locator (ten or twelve digits, according to whether or not the international code has to be used) to control the traffic between two points:

the point of issue sends by teletransmission a list of identifiers and the reception point interrogates the base for information, so that the locator of each identifier and name and address is received automatically at high speed.

It should be noted that a print-out can be effected on a numerical keyboard (usually the right hand side of a computer or calculator keyboard), due to which the main cause of error of routing is eliminated, namely that arising from the use of alpha-numeric keyboards.

The reduction in files enables such rapidity and such convenience in transmission that we can envisage better performance than at present. Here is a practical example:

To provide food-stuffs for a large town requires massive deliveries to a distribution centre. For Paris, we are concerned with the "Marche d'Interet National de Rungis". A supplier of fresh produce is situated about 100 km. from Rungis and its vans take about two hours to get there.

Allowing for the unloading, sorting, regrouping, and light-van loading for the deliveries, traffic delays etc., the heavy vans must arrive at Rungis before midnight. But the regrouping of products of different categories, the loading of light vans and the organisation of the rounds cannot be done until reception of the products and the list of recipients.

The first essential is the departure of the heavy vans, with timing to allow for set-backs: punctures, break-down, accidents, delays etc. Indeed, if the list of recipients is not ready, the van sets off just the same. Whilst it is en route, the list of recipients can be telexed, telecopied or tele-transmitted to the Rungis office.

At the present time, such a screen transmission and the printing onto tickets and labels of 150 orders:

name and address of each recipient, description of reference, takes two and a half hours. If the heavy van leaves without the list and the transmission commences five minutes after his departure, the transmission will be finished 35 mins. after his arrival.

This delay can be even more serious and may reach two hours and a half, if the transmission commences when the heavy lorry arrives at Rungis.

In reality, it is not possible to commence the sorting and regrouping until all the products and the complete list of recipients are simultaneously at Rungis.

Thanks to the invention, this transmission time is reduced from two hours and a half to ten or fifteen minutes. One can see the practical application of the invention which facilitates new technical organisation which is much more flexible and convenient for the personnel.

When dealing with recipients who are already known and regular, we need only transmit the ten first digits of the identifier (operation in "open access").

One apparatus required to apply the invention, apart from a computer (and/or a terminal of the MINITEL type) linked with a software which will be described later, is a coder for editing tickets, possibly sticky labels, on each of which the identifier 1 and the locator 2 of a recipient appears in bar-code, near the name and address in plain language 3.

Figure 6:
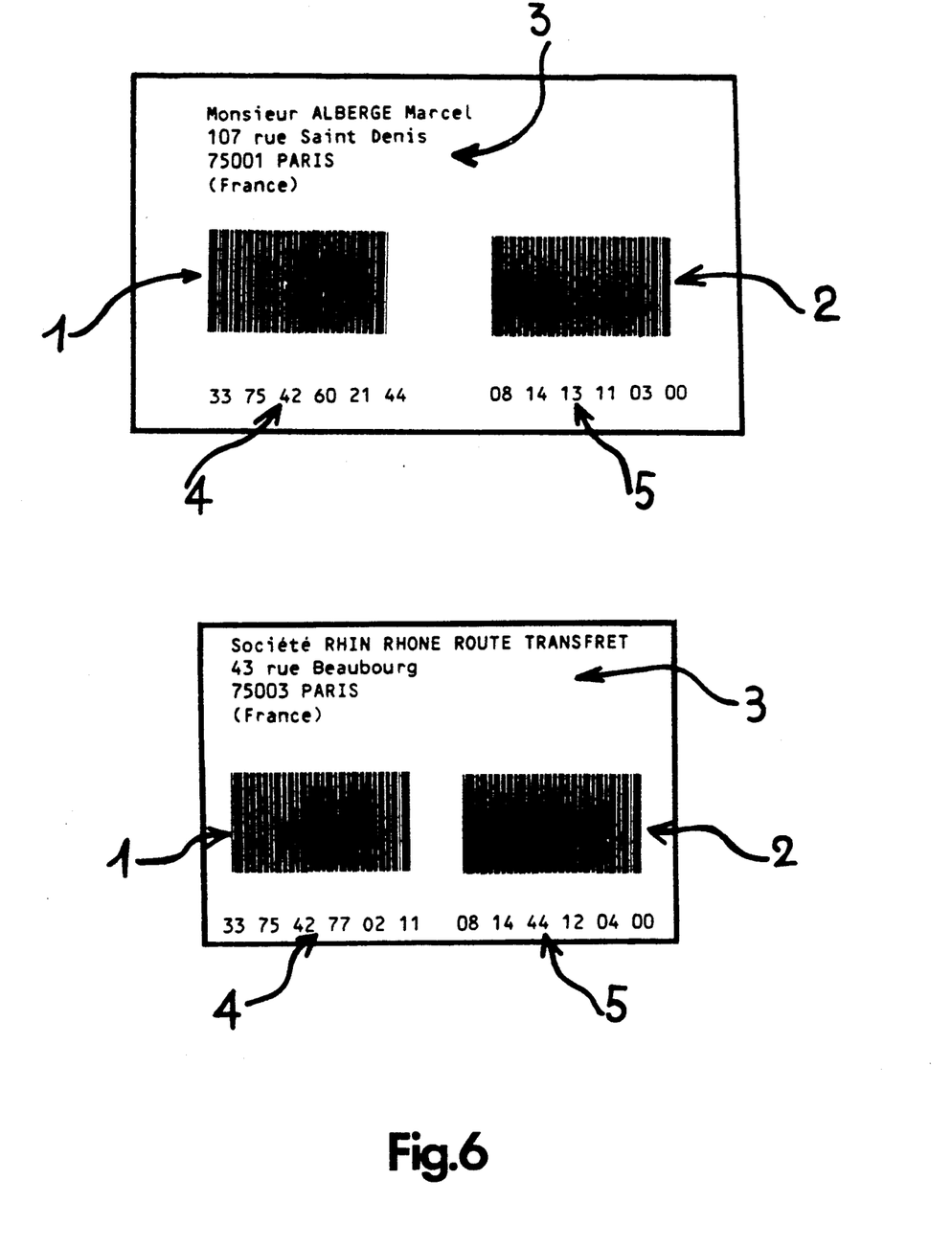
FIGS. 6A & 6B show an example of two labels, according to the invention, bearing firstly, in clear writing, the name, address, identifying and location codes of an addressee, and secondly in the form of a bar code indentifying the addressee and the location.

One can evidently thus provide indication in plain language 4 of the identifier and 5 of the locator according to applications, according to usages and the methods employed (FIG. 6).

Preparations of despatches from one centre (of production, regrouping or distribution etc.) up until the individual delivery to a distant recipient, going through all the intermediate stages of sorting, regrouping, rational placing in the vehicles etc. The operations at each end of the procedure are practically the only ones requiring human intervention; initiative at source and individual delivery and it is in these two periods that indication in plain language is necessary. Otherwise, all the phases of the physical procedure itself can be started, conducted and terminated by mechanical means, automated to a greater or lesser degree.

One can thus see that the process involved in the invention facilitates automation of industrial operations anticipating the action of a device on objects: adjustment, sorting, movement, setting, collecting, grouping etc. The simultaneous indication in plain language and in bar code without manual interface, allows one to consider applying the system to complex processes, which goes beyond the preparation of despatches from a centre (of production, regrouping, distribution etc.) up until the individual delivery to a distant receipient, going through all the intermediate stages of sorting, regrouping, rational placing in vehicles, allocation etc. The operations at each end of this process are practically the only ones which require human interface; initiative at source and individual delivery, and it is in these two periods that plain language indication of the recipient is required.

Otherwise, all the phases of the physical process itself can be started, conducted and terminated by mechanical means automated to a greater or lesser degree.

Figure 7:
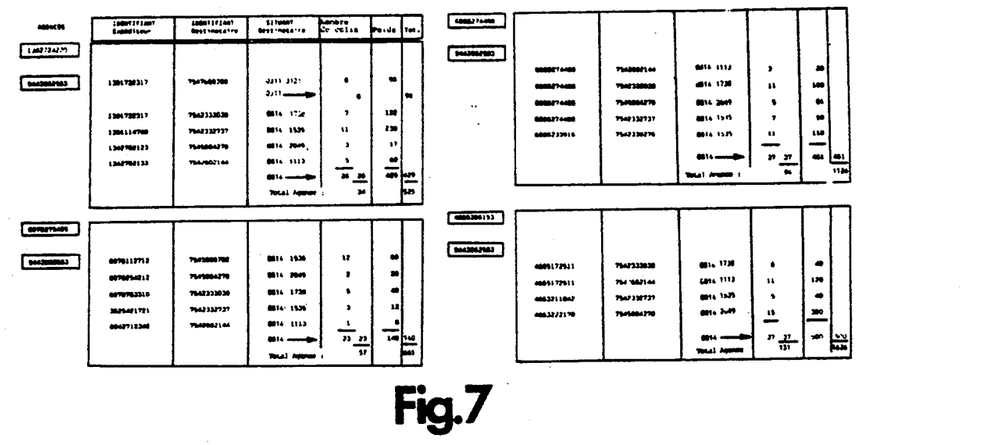
FIGS. 7A & 7B show an invoice of a transport and delivery firm, on which appears the list of parcels, together with the corresponding sender's and addressee's identification symbol and also the addressee's location, the whole for four offices and one group centre.
Figure 8:
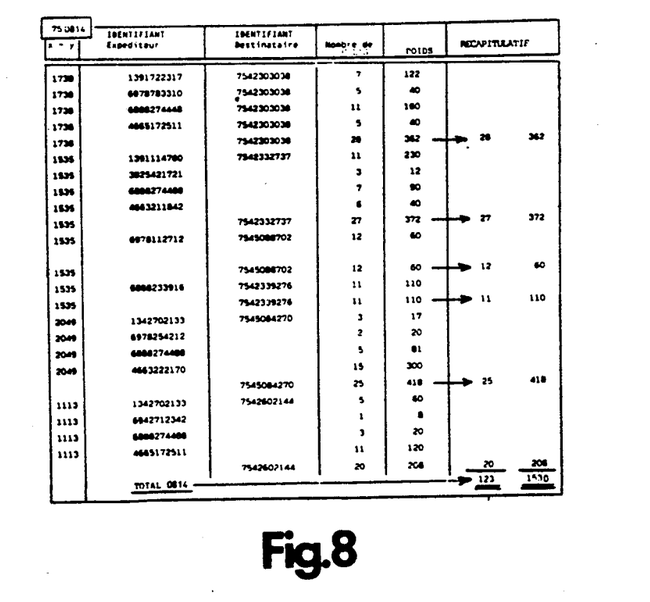
FIG. 8 shows a delivery statement corresponding to the invoice of FIG. 7 and grouped for the parcel of land 08 14 with the details of each addressee.

We are now going to give an example of such a process, using data already provided in FIGS. 2 to 6A,6B as well as FIGS. 7A,7B and 8:

This example pertains to a transport company which has several agencies and centres for regrouping and dispatch and which, of course, has to deliver parcels to many recipients.

This company may receive tons of parcels from a single supplier, of biscuits for example, intended for many shops and supermarkets.

In this case, it is clear that this company certainly receives other products such as tinned foods, for these same supermarkets.

For a regrouping centre, where the company does its sorting and dispatching, it is not just necessary to know as precisely as possible the recipient of each parcel but also the originator and sender if these are different.

Moreover, it is necessary to split up the parcels received, to sort them and regroup them for their destinations. Finally, the vans have to be loaded in a rational order and the delivery rounds have to be organised in sequence, i.e. in relation to the geographical coordinates of the various recipients in the same sector.

The centre for regrouping and sorting for Paris is situated in a suburb of the "department" of Val de Marne (the postal code for this "department" is 94) and has the telephone No. 43 96 25 83. Its identifier is therefore:

---
94 43 96 25 83.
---

This company has agencies, four of which are shown in FIG. 7: one in the department of Bouches du Rhone (13), one in the department of the Rhone (69), one in the department of Haut Rhin (68) and one in the department of Lot (46).

By taking the telephone number of each of them and prefixing the code of department, we obtain the corresponding identifier:

| for the first: | 13 42 72 42 20 |
| for the second: | 69 78 37 54 85 |
| for the third: | 68 88 27 44 88 |
| for the fourth: | 46 65 38 51 53 |

As this transportation is taking place in France, it is not required to prefix the 33 mentioned above. The identifier of each agency is placed above that of the centre for the parcels which the latter is sending and the list is now going to be explained:

Apart from the identifiers of the agencies and the centre, featured on the left, there is a first column of identifiers for dispatchers. It will be noticed that they are all in the department of Bouches du Rhone as their postal code is 13 in each case, but if the agency covers more than one department, the dispatchers could well be situated in various departments and therefore have different codes.

To simplify matters, let us suppose that a first computer sorting has edited the document of FIG. 7A & 7B for the recipients situated exclusively in Paris, in the fragment 08 14 (with one exception which will be later explained).

In the following column, we find the identifiers for the various recipients and we can verify that their location code is 75, that of Paris. In the next column we find the corresponding locators (having all the coordinates of the fragment 08 14) with the exception of the first dispatch; it comes from dispatcher 1391722317 and its recipient is 7547660308 situated in Paris, fragment 03 11, coordinates 31, 21.

We have chosen this particular feature to show that the system can be adapted to certain exceptions and it is here assumed that this dispatch out of sector has a purpose and does not constitute an error and, finally, the number of the parcels and their weights, as well as a column of cumulated and partial totals.

It can be observed that this document, although intermediate, already gives precious information, as one knows agency by agency, the number of the parcels and their total weights for the main fragment 08 14 and for the secondary fragment here 03 11. It therefore suffices to ask the total of all the agencies to know the charge of work fragment by fragment.

The system adapted to this work of regrouping works of course with the identifiers and the locators and provides finally the deliveries according to the coordinates specified from each fragment and here we use only the fragment 08 14, as it is represented in the FIG. 8. On it, we see (top left) the code of the geographical location: 75 (Paris) 08 14 (fragment).

The first column is that of coordinates x and y, the second is that of the identifiers of the dispatchers, the third-that of the identifiers of the recipients and finally, for each despatch, the number of the parcels and their weight as well as their totalization.

This document clearly shows that the same recipient 75 42 30 30 38 situated at 75 08 14 17 38, receives four despatches of 7, 5, 11 and 5 parcels from four different suppliers, for a total of 28 parcels and 362 kilogrammes.

We also see that at the coordinates 15 35, there are three different recipients, which means that it is a block of flats or that there are three shops etc.

The last line of this schedule gives the number of parcels and the total deliveries of the fragment 08 14: 123 parcels and 1,530 kilogrammes.

We check that the two figures correspond with those of the document, FIG. 7. minus those corresponding with delivery out of sector: 8 parcels of 96 kilos for the locator 03 11 31 21. From this data, it is easy to organise the loading, the round and the deliveries.

At the regrouping centre, there is a conveyor of known type (not shown) comprising a closed track conveyor, such as the baggage conveyor they have in airports, on which the parcels arrive in random sequence via at least one entrance. It may be posted packets, parcels of all sorts, preserved food-stuffs, cases, cartons etc.

This conveyor has several track switches of known type, often called "gendarme" which actuated by a motor, rotate to deflect the parcels either away from the track or to let them continue on their path, or obliquely onto said track to make the checked parcels leave the conveyor and proceed to a storage area or another conveyor or receptacle etc.

With the sample described herein, each of the parcels is provided with its label which has a bar code and the installation contains a reader for said code. It would be acceptable for an operator to manipulate a mobile reader or "optic pencil" over labels randomly placed.

We could also envisage standardisation of label sticking and a fixed reader, with all the parcels, without exception, passing in front of the reader. The latter includes an electronic unit which interprets each bar code and is capable of giving commands to the motor of the track switches, respectively to each switch, in relation to each parcel according to its destination.

The electronic unit is linked with a computer system designed according to the applications.

This system, for example, may have a program of geographical location, detailed to the extent of storing in memory all the possible delivery points by zone and mode of access: hours of authorisation and prohibition, particular rulings, width of roads, conditions of approach (one way streets, parking regulations etc.) It is therefore possible, not only to control the sorting of the parcels sector by sector (fragment by fragment) but also to group them by van and, even to distribute the parcels in order of delivery, so that the parcel for the last recipient is loaded first, at the front of the van and the parcel for the first recipient—last, at the back of the van.

This obviously implies that the computer system has in its memory all the geographical facts of the rounds and it is easy to produce a print-out of a "route schedule" for each van driver, so that he is automatically guided via the best route; either the shortest or the quickest.

The system sorts the parcels by sectors, or fragments and then by road and route.

From the schedule in FIG. 8, we take the following description for deliveries intended for rue Saint Denis. This is in one direction from North to South. The optimisation of the round is provided by the system, which provides for entering rue Saint Denis via its junction with rue Reamur, which runs from West to East, as this junction is the first possible access for locating the first client.

The van must therefore arrive either via the West of rue de Reamur, or via the North of rue Saint Denis, or again, via the Boulevard de Sebastapol and rue de Caire according to the point of departure of the particular van.

Once in the rue Saint Denis, the van will deliver in the following order:

| 1 - "CREPUSCULE", 162 rue Saint Denis |
| --- |
| 75 45 08 42 70 |
| 2 - HAMILTON James, 128 rue Saint Denis |
| 75 42 33 30 38 |
| 3 - PETIT Susanne, 143 rue Saint Denis |
| 75 42 33 27 37 |
| 4 - MASY Guy, 143 rue Saint Denis |
| 75 42 33 92 76 |
| 5 - COUTEILLE Herve, 143 rue Saint Denis |
| 75 45 08 87 02 |
| 6 - ALBERGE Marcel, 107 rue Saint Denis |
| 75 42 60 21 44 |

The loading of the van will have been done in good sequence to optimise the round, taking account of distance in kilometres and duration, in the following way:

The loading commenced with the last recipient and finished with the first:

|  | Parcels | Kilogrammes |
| --- | --- | --- |
| 75 42 60 21 44 08 14 11 13 | 20 | 208 |
| 75 45 08 87 02 08 14 15 35 | 12 | 60 |
| 75 42 33 92 76 08 14 15 35 | 11 | 110 |
| 75 42 33 27 37 08 14 15 35 | 27 | 372 |
| 75 42 33 30 38 08 14 17 38 | 28 | 362 |
| 75 45 08 42 70 08 14 20 49 | 25 | 418 |

In reality, a round often comprises many more recipients and the invention is all the more advantageous by the simplification which it renders.

The grouping, organised before the departure may actually be done by means of pelettes, containers, box-palettes etc.

It should be noted that, the invention envisaging control by devices with public digital access, facilitates the establishment of certain installations which, at present are very complicated, indeed impracticable.

This is notably the case with a device which can be placed on board a vehicle and which shows the optional route between the point of departure (where the vehicle is at a given moment) and the destination of the vehicle.

In effect, it suffices to enter the point of departure according to the coordinates of the required zone, this can be done by successive approximation. For simplification, we can quote the case of a vehicle in Paris, which is at the porte d'Auteuil and is looking for the junction of rue Reaumur and rue Saint Denis.

The driver inputs the coordinate of the departure fragment into the device:

| 75 05 01 |
| --- | then the coordinate where he wants to arrive:

| 75 08 14 57 22 |
| --- |

The device is linked with a computer system which responds to this interrogation by giving a series of characteristic coordinates in travel sequence: squares, monuments, main roads or pre-planned routes or by bringing the route graphically onto a screen by at least a schematic reproduction of the zone concerned, taking account of one way streets, peak periods at certain spots and restrictive regulations etc.

This facilitates the approach to a delivery sector or aids a motorist.

In the case of a delivery organisation of the type described above, we can plan, so that at the moment of the van's departure, we can edit one or a number of documents, which are all created by the process of the invention but which assembles various items of information or information presented at various times:
-grouping schedule,
-road route with distance and probable duration,
-approach plan,
-map and plans
-delivery note
-estimate of weight,
-etc.

The invention can be applied to all physical transportation besides delivered parcels and first and foremost the postman's round. It can facilitate the collection, the sorting the routing and distribution, even to stocking and organising the filling of the individual postman's bag, house by house, letter box by letter box, without manual interface.

For this, we use known machines which carry out the sorting and grouping combined with transportation on land sea or by air. The bar code is particularly appropriate for dealing with letters, as the address layout is sufficiently standard to allow usage of automatic machines for marking and reading off this code at high speed, letter by letter.

A sorting centre can fairly easily be equipped with a device conforming to the invention, which effects the final sorting and complete instructions for the postman, bag by bag, even without going to that extent, it is possible to considerably rationalise the sorting which is done roughly at present.

In stead of using the bar code, we may use computer coding which has the advantage of editing the digits simultaneously in plain language and reading it automatically. The digits of the identifier and of the locator would then appear like those of the present cheques (number of account, cheque, bank etc.) and would, themselves suffice for direct visual comprehension by persons, and automatically by magnetic, optical or other means.

The extreme finesse of machine sorting with the invention facilitates many other applications. Among which, we may quote:
- customer enquiries. At the first stage, the organisation (e.g. a supermarket) gets the identifier of the customer from data which may be the actual information normally supplied when making payments: identity card, cheque, credit card etc.

The identifiers are collected, classified and placed into a memory. A computer system then enables us to handle this data in any way we require: statistically or graphically. We can provide for screen appearance of geographical fragments and illuminating point by point the customers by the coordinates of their homes, thanks to which, we can have an immediate view of the locations of the clientele.
- The geographical approach in seeking persons. For example, a temporary employment agency seeking a certain worker can choose from personnel most appropriate to his clients requirements, the one that lives nearest to the place of work or to the most direct public transport route. Another example is that if someone is seeking a television repair technician in a large town, at the present time one finds a large number of possibles in the telephone directory (printed or electronic by MINITEL in France) but finds difficulty in choosing the one nearest one's home; all the tradesmen are listed in alphabetical order. One has to look right through the list and guess which one is nearest home. Thanks to the invention, it suffices to put the locator of the person who seeks the tradesman into the device for the computer system to reply to the question posed, with great accuracy.

As described above, it is possible to replace the Cartesian coordinates by the numbers of the fragments, which is especially adaptable to rural areas. In this case, we use the land registry plan and we take the individual numbers, without relating to a virtual orthoganal system.

A recipient living in an isolated house in the country (but necessarily attached to a community and possessing a postal code) would be, for example:

| 33 64 990 59 59 03 84 4822 |
|---|
| 33 = France |
| 64 = Pyrennees Atlantiqes |
| 990 = Commune de Villefranque, |
| 59 59 03 84 = No. of telephone, |
| 4822 = No. of the fragment of the Commune where the recipients house is located. |

From the above description, it is obvious that starting with an identifier only, one can obtain the corresponding locator and starting with the locator only, one can obtain all the identifiers having this locator in common.

This facilitates cross-checking, verification and traffic facilities unknown up until the present time.

I claim:

1. A process of delivering a message to a recipient, comprising the steps of:
   determining an identifier for the recipient which is a combination of a code which represents a geographical location of the recipient and a telephone number of the recipient, and
   determining a locator for the recipient from a grid which is internationally established for a certain geographical zone, the locator including coordinates of a grid which represent a most accurate geographical location possible of the recipient;
   correlating the telephone number of the recipient with the geographical location of the recipient from either the identifier or the locator, and determining whether an error exists in the address by determining if the telephone number exists within the geographical location; and
   delivering the message to the recipient if the correlating step indicates that the telephone number exists in the geographical location.

* * * * *